(12) United States Patent
Wang et al.

(10) Patent No.: US 10,133,383 B2
(45) Date of Patent: Nov. 20, 2018

(54) TOUCH DISPLAY PANEL, TOUCH DISPLAY DEVICE AND DRIVING METHOD

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Haisheng Wang, Beijing (CN); Xue Dong, Beijing (CN); Hailin Xue, Beijing (CN); Xiaochuan Chen, Beijing (CN); Xiaoliang Ding, Beijing (CN); Yingming Liu, Beijing (CN); Weijie Zhao, Beijing (CN); Shengji Yang, Beijing (CN); Wei Liu, Beijing (CN); Changfeng Li, Beijing (CN); Hongjuan Liu, Beijing (CN); Pengpeng Wang, Beijing (CN)

(73) Assignees: BOE TECHNOLOGY GROUP CO., LTD. (CN); BEIJING BOE OPTOELECTRONICS TECHNOLOGY CO., LTD. (CN)

( * ) Notice: Subject to any disclaimer, the term of this patent is extended or adjusted under 35 U.S.C. 154(b) by 0 days.

(21) Appl. No.: 15/325,653

(22) PCT Filed: May 26, 2016

(86) PCT No.: PCT/CN2016/083440
§ 371 (c)(1),
(2) Date: Jan. 11, 2017

(87) PCT Pub. No.: WO2017/075978
PCT Pub. Date: May 11, 2017

(65) Prior Publication Data
US 2018/0232085 A1    Aug. 16, 2018

(30) Foreign Application Priority Data

Nov. 3, 2015    (CN) .......................... 2015 1 0740082

(51) Int. Cl.
*G06F 3/041* (2006.01)
*G06F 3/044* (2006.01)
(Continued)

(52) U.S. Cl.
CPC ........ *G06F 3/0412* (2013.01); *G02F 1/13338* (2013.01); *G02F 1/133512* (2013.01);
(Continued)

(58) Field of Classification Search
None
See application file for complete search history.

(56) References Cited

U.S. PATENT DOCUMENTS 5,915,285 A * 6/1999 Sommer ............... G01L 1/2287
338/2
2006/0227114 A1* 10/2006 Geaghan ............... G06F 3/0418
345/173
(Continued)

FOREIGN PATENT DOCUMENTS

| CN | 102866813 A | 1/2013 |
| CN | 102955613 A | 3/2013 |

(Continued)

OTHER PUBLICATIONS

PCT International Search Report and Written Opinion dated Aug. 29, 2016, Application No. PCT/CN2016/083440, 12 Pages.
(Continued)

*Primary Examiner* — Jennifer Mehmood
*Assistant Examiner* — Parul Gupta
(74) *Attorney, Agent, or Firm* — Brooks Kushman P.C.

(57) ABSTRACT

A touch display panel, a touch display device and a driving method are provided. The touch display panel includes an
(Continued)

array substrate, an opposite substrate arranged opposite to the array substrate, a touch electrode arranged at a side of the array substrate facing the opposite substrate, and an antistatic layer arranged inside the touch display panel. The antistatic layer is located at a side of the opposite substrate facing the touch electrode, and the antistatic layer and the touch electrode are capable of forming a capacitive force sensor in the case that the antistatic layer is applied with a force scanning signal.

20 Claims, 5 Drawing Sheets

(51) Int. Cl.
G02F 1/1333 (2006.01)
G02F 1/1362 (2006.01)
G02F 1/1343 (2006.01)
G02F 1/1335 (2006.01)

(52) U.S. Cl.
CPC .. *G02F 1/134309* (2013.01); *G02F 1/136204* (2013.01); *G02F 1/136286* (2013.01); *G06F 3/044* (2013.01); *G06F 3/0414* (2013.01); *G02F 2201/121* (2013.01)

(56) References Cited

U.S. PATENT DOCUMENTS

| | | | |
|---|---|---|---|
| 2006/0279548 A1* | 12/2006 | Geaghan | G06F 3/0416 345/173 |
| 2009/0140996 A1* | 6/2009 | Takashima | G06F 1/1626 345/173 |
| 2013/0033450 A1* | 2/2013 | Coulson | G06F 3/044 345/174 |
| 2014/0307186 A1 | 10/2014 | Yun et al. | |
| 2015/0301660 A1* | 10/2015 | Watazu | G06F 3/045 345/173 |
| 2017/0031503 A1* | 2/2017 | Rosenberg | G06F 3/017 |
| 2017/0090637 A1* | 3/2017 | Yoon | G06F 3/0414 |

FOREIGN PATENT DOCUMENTS

CN 105009045 A 10/2015
CN 205068346 U 3/2016

OTHER PUBLICATIONS

CN102866813A, English Abstract.
CN102955613A, English Abstract.
CN105009045A, English Abstract.
CN205068346U, English Abstract.

* cited by examiner

TOUCH DISPLAY PANEL, TOUCH DISPLAY DEVICE AND DRIVING METHOD

CROSS-REFERENCE TO RELATED APPLICATIONS

This application is the U.S. national phase of PCT Application No. PCT/CN2016/083440 filed on May 26, 2016, which claims priority to Chinese Patent Application No. 201510740082.8 filed on Nov. 3, 2015, the disclosures of which are incorporated in their entirety by reference herein.

TECHNICAL FIELD

The present disclosure relates to the field of liquid crystal display, and in particular, to a touch display panel, a touch display device and a driving method.

BACKGROUND

The electronic products nowadays are usually provided with touch display panels. The capacitive touch display panel is the most common type of touch display panel.

The capacitive touch display panel operates based on current induction caused by a human body. Usually, the capacitive touch display panel is a four-layer composite glass screen. When a user touch a surface of the capacitive touch display panel with a finger, a coupling capacitor is generated between the user and the surface of the capacitive touch display panel due to electrical field of human body. Such capacitor may be deemed as a conductor for a high frequency current. Small current may flow into the finger at a touch point where the finger touches the surface of the capacitive touch display panel. The small current may flow out of the capacitive touch display panel from electrodes at four corners of the capacitive touch display panel. Each of the four currents flowing through the electrodes at the four corners respectively is proportional to a distance from the finger to the corner. A controller may determine a location of the touch point by calculating proportional relationship among the four currents accurately.

Force touch is a touch sensing technique applied to liquid crystal display device, with which the display device may sense the value of any force applied by the user to the screen; hence, more kinds of touch operation can be achieved.

The touch screen in related art already has mature structure, and the present disclosure intends to achieve force touch function by making minor changes to the touch screen in related art.

SUMMARY

The present disclosure intends to make minor changes to the structure of the touch display panel in related art to achieve the force touch function.

In one aspect, a touch display panel is provided according to some embodiments of the present disclosure, including an array substrate; an opposite substrate arranged opposite to the array substrate; a touch electrode arranged at a side of the array substrate facing the opposite substrate; and an antistatic layer arranged inside the touch display panel. The antistatic layer is located at a side of the opposite substrate facing the touch electrode, and the antistatic layer and the touch electrode are capable of forming a capacitive force sensor in the case that the antistatic layer is applied with a force scanning signal.

Optionally, a resistivity of the antistatic layer is not less than a preset threshold.

Optionally, the touch display panel further includes a black matrix arranged between the opposite substrate and the antistatic layer; and auxiliary electrodes arranged at a side of the antistatic layer facing the touch electrode. Wherein a resistivity of the auxiliary electrodes is less than that of the antistatic layer, the auxiliary electrodes are located within a region of a projection of the black matrix onto the antistatic layer and is electrically connected to the antistatic layer.

Optionally, the touch display panel further includes data lines and gate lines; the auxiliary electrodes include a plurality of first auxiliary electrodes extending in a direction identical to the gate lines; and a plurality of second auxiliary electrodes extending in a direction identical to the data lines, wherein the first auxiliary electrodes and the second auxiliary electrodes are spaced apart from each other. Or, the auxiliary electrodes include a third auxiliary electrode and a fourth auxiliary electrode, the third auxiliary electrode and the fourth auxiliary electrode are each of a grid structure, the third auxiliary electrode is spaced part from the fourth auxiliary electrode, and the third auxiliary electrode and the fourth auxiliary electrode are evenly distributed in a region where the antistatic layer overlaps the touch electrode.

Optionally, an overall resistance value of the antistatic layer is not less than $108\Omega$ and is not greater than $1010\Omega$.

Optionally, an overall resistance of the antistatic layer is $108\Omega$.

In another aspect, a touch display device including the above touch display panel is provided in the present disclosure. The touch display device further includes a driving module configured to apply the force scanning signal to the antistatic layer at a force scanning stage of the touch display device.

Optionally, the touch display panel further includes: a detection module configured to detect a change of a capacitance value of a mutual capacitance formed between the antistatic layer and the touch electrode at the force scanning stage; and a processing module configured to determine the value of a corresponding force based on the change detected by the detection module.

Optionally, the driving module is further configured to apply a common electrode signal to the touch electrode at a display stage of the touch display device, and apply a touch scanning signal to the touch electrode at a touch scanning stage of the touch display device.

Optionally, the force scanning signal is a common electrode signal.

In another aspect, a method for driving the above touch display device is provided in the present disclosure. The method includes: applying the force scanning signal to the antistatic layer at a force detecting stage.

Optionally, the method further includes: applying a common electrode signal to the touch electrode at a display stage; and applying a touch scanning signal to the touch electrode at a touch scanning stage.

Optionally, the method further includes: applying the common electrode signal to the touch electrode and the antistatic layer at the display stage; and maintaining the antistatic layer in a floating state during a touch detecting stage.

Optionally, the method includes: applying a common electrode signal to the touch electrode and applying a touch scanning signal to the antistatic layer, at the force scanning stage.

Technical solution of the present disclosure has the following beneficial effects. The antistatic layer arranged at the exterior of the touch display panel in related art is herein arranged inside the touch display panel and serves as an electrode. In the driving method, a force detecting stage is added into a time frame. At the force detecting stage, a force scanning signal is applied to the antistatic layer. When a user presses the screen with a finger, the antistatic layer is deformed and capacitance between the antistatic layer and the touch electrode is changed, and a force applied by the user's finger to the screen is determined based on the change of the capacitance. Since the antistatic layer already exists in related art, in the present disclosure, no new layer needs to be added to the structure of the existing touch display panel.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort. The described drawings are not necessarily drawn to scales respect to actual sizes and are merely for illustration purposes only.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

In related art, in order to prevent a screen of a capacitive touch display panel from being broken down by static electricity, an antistatic layer is arranged at exterior of the screen to discharge the static electricity. Since the antistatic layer in the capacitive touch display panel is conductive, the antistatic layer is regarded as an electrode in technical solution of the present disclosure, and the antistatic layer and a touch electrode form a capacitive sensor for detecting a force on the screen.

Figure 1:
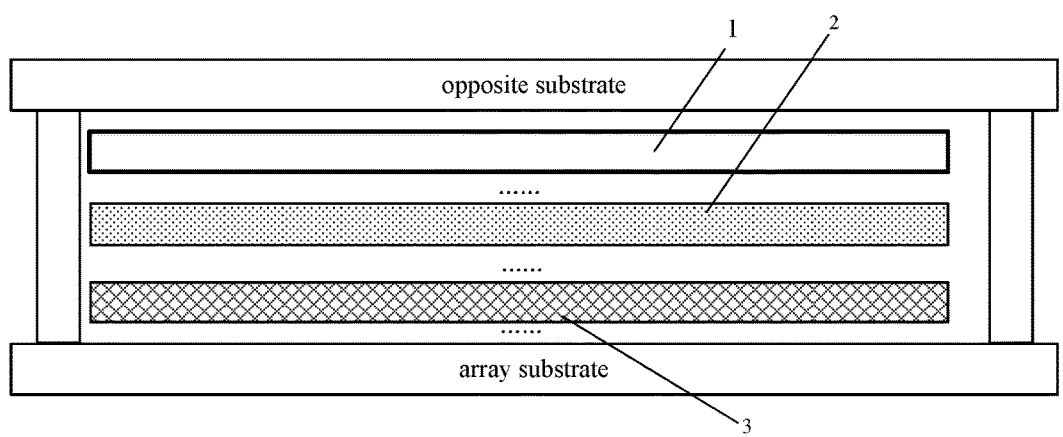
FIG. 1 is a schematic structural diagram of a touch display panel in the present disclosure.

In accordance with the above technical solution, a touch display panel is provided according to some embodiments of the present disclosure. As shown in FIG. 1, the touch display panel includes an array substrate, an opposite substrate arranged opposite to the array substrate, a touch electrode 3 arranged at a side of the array substrate facing the opposite substrate, and an antistatic layer 2 for static electricity discharging. The antistatic layer 2 is located at an inner side of a screen 1 of the display panel, and when the antistatic layer 2 is applied with a force scanning signal, the antistatic layer 2 and the touch electrode 3 are capable of forming a capacitive force sensor. When the user presses the screen with a finger, the antistatic layer 2 is deformed, the capacitance between the antistatic layer 2 and the touch electrode is changed, and the value of a force applied by the user to the screen can be determined based on change of the capacitance. The antistatic layer already exists in related art; hence, in the embodiments of the present disclosure, no new electrode layer needs to be added to the structure of the touch display panel and the thickness of the touch display panel may not be increased.

At a touch scanning stage of the touch display panel, a touch scanning signal starts to be applied to the touch electrode. To ensure that the touch scanning signal can reach the screen through the antistatic layer, the antistatic layer may be made of a high-resistive material having a resistivity not less than a preset threshold. The preset threshold is a reasonable value which ensures that the touch scanning signal can pass through the antistatic layer. Practically, an overall resistance of the antistatic layer ranges from 108Ω to 1010Ω, optionally, is 108Ω.

Further, in the capacitor formed by the antistatic layer and the touch electrode, the antistatic layer has a large resistance and generates a small current in charging or discharging; hence, charging and discharging function of the capacitor is adversely affected and force touch is not sensitive enough. In view of the above, the touch display panel according to some embodiments may optionally include a black matrix arranged between the opposite substrate and the antistatic layer, and auxiliary electrodes electrically connected to the touch electrode are arranged at a side of the antistatic layer facing the touch electrode. The auxiliary electrodes has a resistivity less than that of the antistatic layer and is located within a region of a projection of the black matrix onto the antistatic layer; therefore, a display region may not be shielded by the auxiliary electrodes. With the auxiliary electrodes, the overall resistance of the antistatic layer can be adjusted and a difference between a resistance of the touch electrode and the overall resistance of the antistatic layer can be reduced reasonably.

The touch display panel according to the embodiments is detailed hereinafter based on an implementation.

Figure 2:
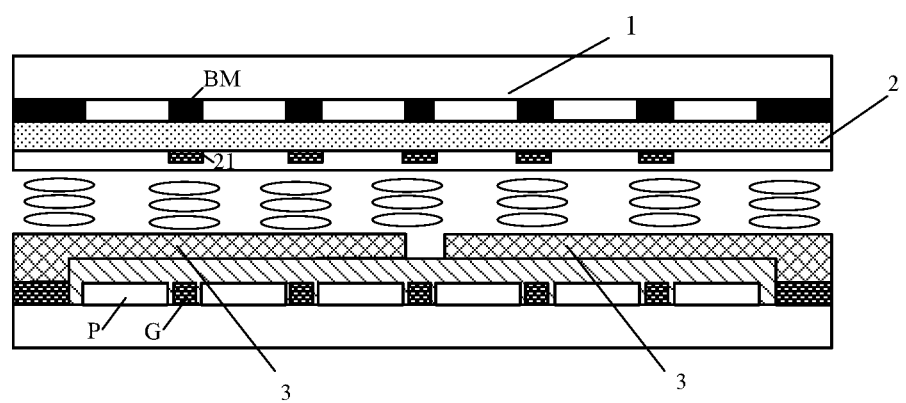
FIG. 2 is a schematic structural diagram of a touch display panel in some implementations of the present disclosure.

As shown in FIG. 2, a touch display panel in the implementation includes an opposite substrate, i.e., a substrate above a liquid crystal layer in FIG. 2 and an array substrate, i.e., a substrate below the liquid crystal layer in FIG. 2 that are opposite to each other. In the implementation, for example, a touch electrode of the touch display panel further serves as a common electrode, a layer 3 above the array substrate represents both the common electrode and the touch electrode.

Pixel electrodes P and gate lines G are further provided on the array substrate. A black matrix BM and an antistatic layer 2 are provided on a base of the opposite substrate.

Auxiliary electrodes 21, made of a conductive material such as ITO or metal, are further provided on the antistatic layer 2. The auxiliary electrodes 21 are located within a region of a projection of the black matrix BM onto the antistatic layer 2 and are electrically connected to the antistatic layer. It should be noted that, at the force scanning stage, at least a portion of the antistatic layer 2 that overlaps the touch electrodes 3 functions as an electrode. Optionally, the auxiliary electrodes 21 are evenly distributed at least in the region where the antistatic layer 2 overlaps the touch electrodes, in this way, the resistance of the portion of the antistatic layer 2 functioning as the electrode can be reduced.

Figure 3:
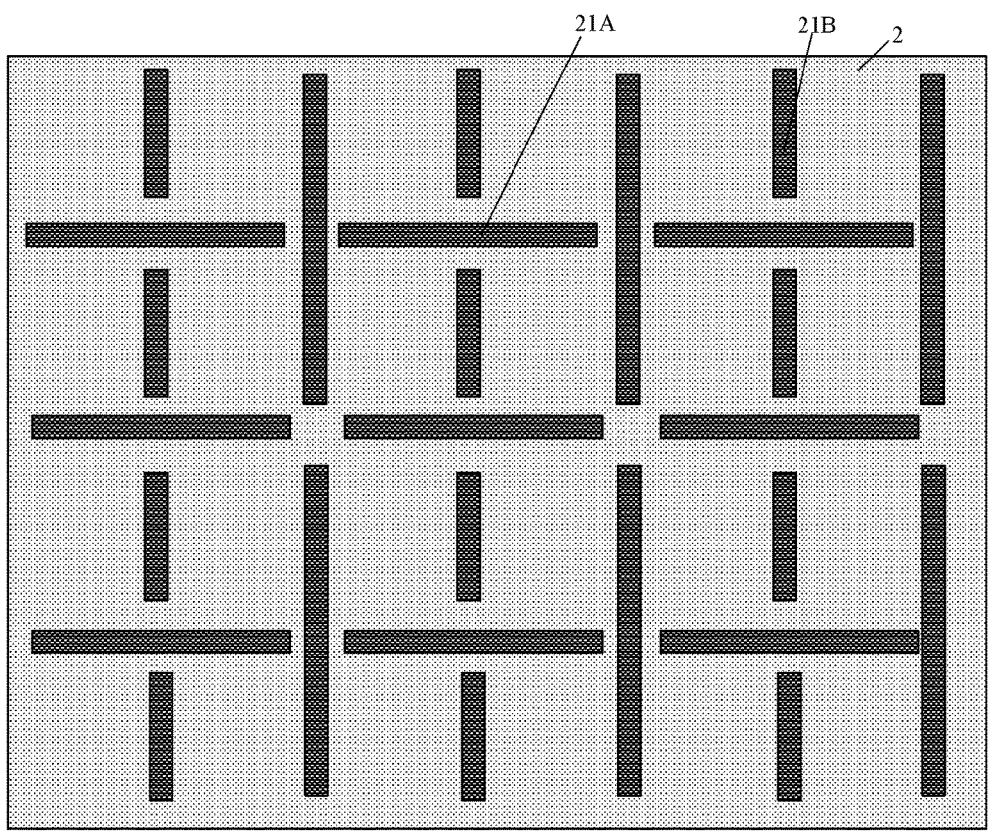
FIG. 3 and FIG. 4 are schematic structural diagrams of two kinds of structures of an antistatic layer provided with auxiliary electrodes.

Exemplarily, as shown in FIG. 3, there may be multiple auxiliary electrodes in the implementation, including first auxiliary electrodes 21A (horizontal stripes in FIG. 3) extending in a gate line extending direction and second auxiliary electrodes 21B (vertical stripes in FIG. 3) extending in a data line extending direction. For preventing the high resistance of the antistatic layer from being affected, the first auxiliary electrodes 21A and the second auxiliary electrodes 21B are spaced apart from each other.

Figure 4:
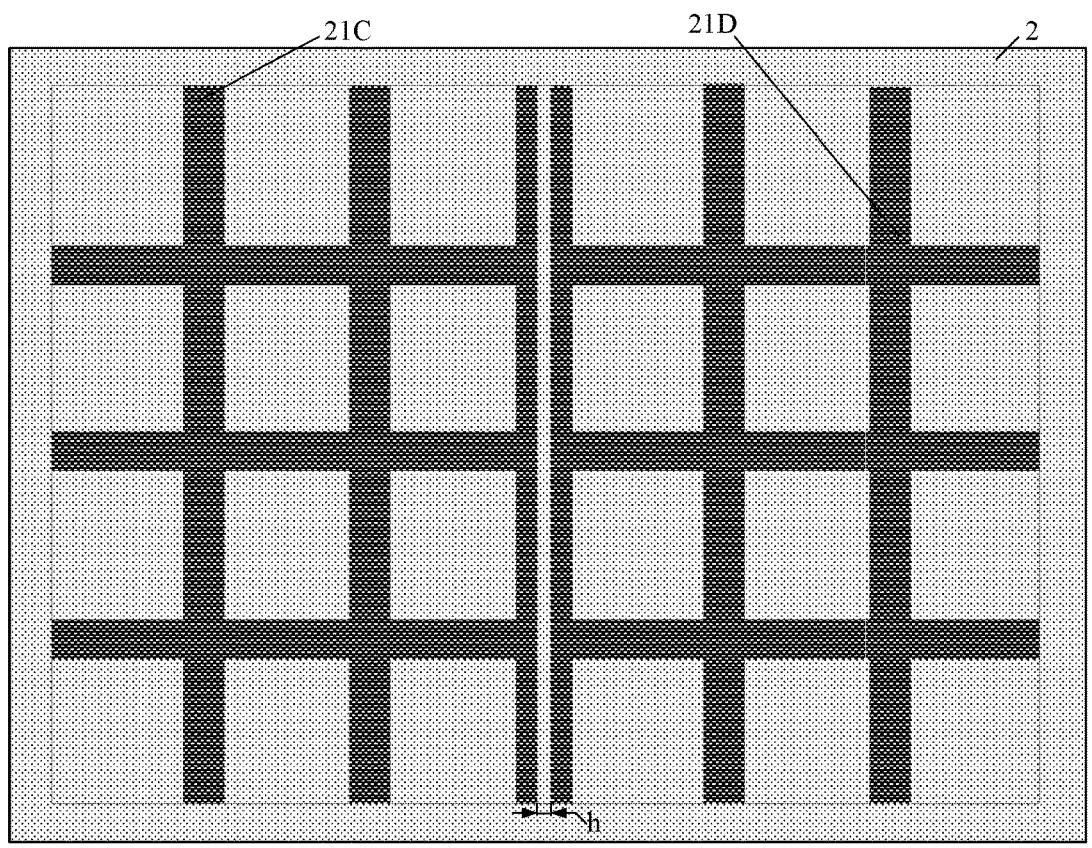

Alternatively, as shown in FIG. 4, the auxiliary electrodes in the implementation may include a third auxiliary electrode 21C and a fourth auxiliary electrode 21D that are of a grid structure. Similarly, in order to prevent the high resistance of the antistatic layer from being affected, the third auxiliary electrode 21C is spaced from the fourth auxiliary electrode 21D by a length of h. Practically, the overall resistance of the antistatic layer 2 may be set within a reasonable range by adjusting the value of h, for example, from 1.5 micrometers to 2.5 micrometers.

It should be noted that, the arrangements and structures of the auxiliary electrodes in FIG. 3 and FIG. 4 are merely for illustration purposes only. In practical, the ordinary skilled in the art may make proper changes to the auxiliary electrodes according to requirement on resistivity of the antistatic layer, for example, the auxiliary electrodes may be connected to each other, or the auxiliary electrodes are distributed unevenly, or no auxiliary electrodes are provided at all.

The touch display panel according to embodiments of the present disclosure is described as above. It can be found that, the antistatic layer arranged at the exterior of screen of the touch display panel in related art is herein arranged at the inner side of the screen and serves as an electrode. Hence, minor changes are made to the structure of existing touch display panel to achieve the force touch function.

In addition, a touch display device including the above-described touch display panel is provided according to some embodiments of the present disclosure. In addition to the touch display panel, the touch display device further includes a driving module (such as an integrated circuit), that is used to apply a force scanning signal to the antistatic layer at a force scanning stage of the touch display device.

Furthermore, the touch display device may further include a detection module and a processing module. The detection module is used to detect change of a value of a mutual capacitance formed between the antistatic layer and a touch electrode at a force scanning stage. The processing module is used to determine the value of a corresponding force based on the change detected by the detection module.

In practical, after the antistatic layer is applied with the force scanning signal, the capacitor formed by the antistatic layer and the touch electrode performs charging and discharging. When a user presses the display panel with a finger, the antistatic layer is deformed, the charging and the discharging of the capacitor is changed. According to some embodiments, the detection module may determine the change of the capacitance value based on the change of the charging and the discharging of the capacitor. In some embodiments, a threshold for the change of the electric quantity charged into and discharged by the capacitor is set in the processing module, and the processing module determines an intention of the user pressing the display panel in the case that an actual change exceeds the threshold, to achieve a subsequent force operation.

Optionally, in the case that the touch electrode further serves as the common electrode, according to some embodiments, the driving module applies a touch scanning signal and a common electrode signal to the touch electrode in a time-division manner. In other words, at a display stage of the touch display device, the driving module applies the common electrode signal to the touch electrode; at a touch scanning stage of the touch display device, the driving module applies the touch scanning signal to the touch electrode.

A structure of the touch display device according to the embodiments is detailed based on an implementation.

Figure 5:
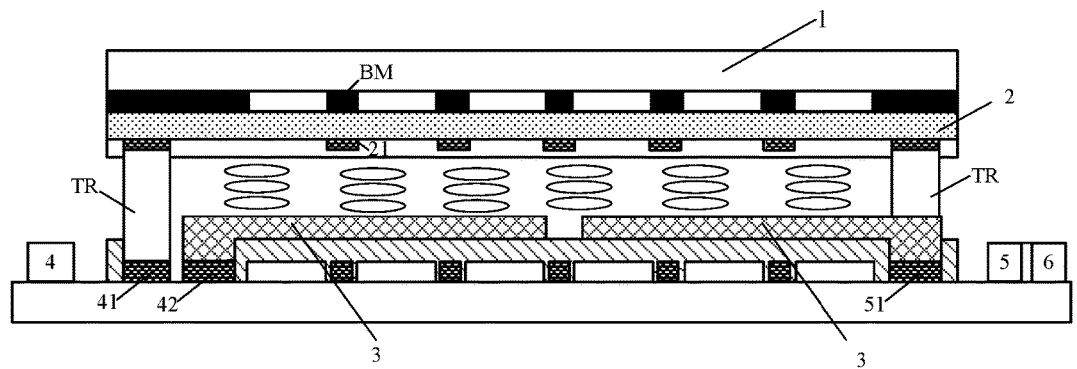
FIG. 5 is a schematic structural diagram of a touch display device in some implementations of the present disclosure.

As shown in FIG. 5, the touch display device in the implementation includes the structure of the touch display panel in FIG. 2 and further includes a driving module 4, a detection module 5 and a processing module 6.

Output terminals 41 and 42 of the driving module 4 are provided on the array substrate. The antistatic layer 2 on the opposite substrate is connected to the output terminal 41 via conductive adhesive TR, such that the antistatic layer 2 is applied with a force scanning signal from the driving module 4 at a force detecting stage. The touch electrode 3 on the array substrate is connected to the output terminal 42, such that the touch electrode 3 is applied with the touch scanning signal from the driving module 4 at the touch scanning stage and is applied with the common electrode signal from the driving module 4 at the display stage.

In addition, the array substrate in the implementation is further provided with an input terminal 51 for the detection module 5. The input terminal 51 is directly connected to the touch electrode 3. The antistatic layer 2 is connected to the touch electrode 3 via a conductive adhesive TR. At the force detecting stage, the antistatic layer 2 is applied with a force detecting signal, the detection module 5 may detect change of a value of the mutual capacitance between the antistatic layer 2 and the touch electrode 3, and the processing module 6 determines the value of a corresponding force based on the change detected by the detection module.

The implementation of the touch display device is described above. It should be noted that, the structure shown in FIG. 4 is merely exemplary. In other implementations, the touch electrode and the common electrode may be of two different electrode layers, and the electrode layer may be arranged on the array substrate, or maybe arranged on the opposite substrate and below the antistatic layer.

Further, a method for driving the above-described touch display device is provided according to some embodiments of the present disclosure. The method, executable by the above-described driving module, includes: applying a touch scanning signal to a touch electrode at a touch scanning stage; and applying a force scanning signal to an antistatic layer at a force detecting stage.

Optionally, the method in the present disclosure can be applied to a case that the touch electrode further serves as a common electrode. Hence, the method further includes: applying a common electrode signal to the touch electrode at a display stage; and applying the touch scanning signal to the touch electrode at the touch scanning stage.

The driving method according to the embodiments is detailed hereinafter based on an implementation.

Figure 6:
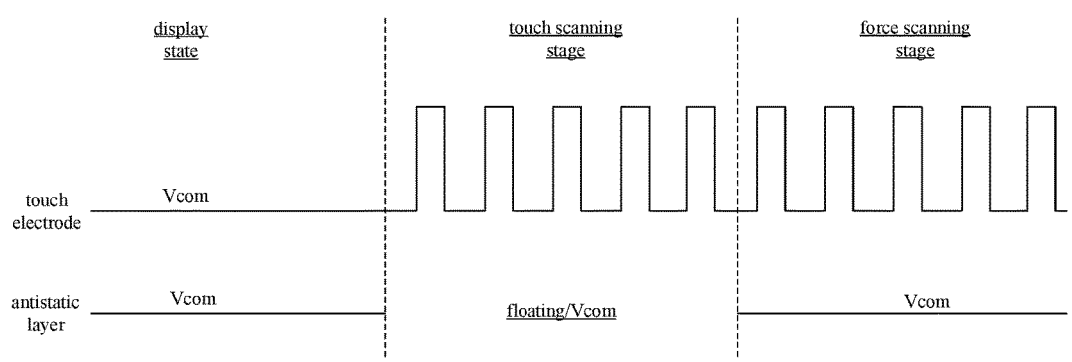
FIG. 6 is a schematic sequential diagram of am driving method in some implementations of the present disclosure.

As shown in FIG. 6, in addition to the time-division driving in the display stage and the touch scanning stage, a force detecting stage is added. That is, a portion of the time in one frame is assigned to the force detecting stage.

At the display stage, the touch electrode, functioning as the common electrode, is connected to a level of Vcom and is used to control deflection of liquid crystals. The antistatic layer is used to discharge static electricity from outside of the screen. In the implementation, the antistatic layer is also connected to the level of Vcom, thereby protecting the common electrode from being interfered.

At the touch scanning stage, the touch electrode is applied with a touch scanning signal in form of impulse wave and is used to detect a touch operation performed by a user on the screen. Similar to the display stage, the antistatic layer is used to discharge static electricity from the outside of the screen. Here, the antistatic layer is in a floating state to ensure that the touch scanning signal can pass through the antistatic layer effectively. The floating state is merely optional; in practical, since a value of the overall resistance of the antistatic layer may reach several megohms, the antistatic layer, even if connected to the level of Vcom, may not affect transmission of the touch scanning signal in substance.

At the force scanning stage, the touch electrode and the antistatic layer form a capacitive force sensor. The antistatic layer is applied with a force scanning signal at a constant level (the level of Vcom as shown in FIG. 6) and the touch electrode is applied with an impulse signal (the touch scanning signal as shown in FIG. 6), such that the capacitor performs charging and discharging at the force scanning stage. Alternatively, the antistatic layer may be applied with a force scanning signal in form of impulse wave and the touch electrode is applied with a constant level. When the user presses the screen with a finger, the charging and discharging of the capacitor is changed, and change of the value of the capacitance can be determined based on the change.

Practically, a small portion, e.g., about 2 ms, of the time in one frame may be assigned to the touch scanning stage while one frame may last 16.67 ms, and thus the display may not be adversely affected even the antistatic layer is in the floating state during the touch scanning stage.

In view of the above, with the touch display device and the driving method provided in the present disclosure, the display panel can achieve both in-cell touch function and force touch function.

The above are merely the preferred embodiments of the present disclosure. A person skilled in the art may make further modifications and improvements without departing from the principle of the present disclosure, and these modifications and improvements shall also fall within the scope of the present disclosure.

What is claimed is:

1. A touch display panel, comprising:
   an array substrate;
   an opposite substrate arranged opposite to the array substrate;
   a touch electrode arranged at a side of the array substrate facing the opposite substrate; and
   an antistatic layer arranged inside the touch display panel, wherein the antistatic layer is located at a side of the opposite substrate facing the touch electrode, and the antistatic layer and the touch electrode are capable of forming a capacitive force sensor in the case that a force scanning signal is applied to the antistatic layer.

2. The touch display panel according to claim 1, wherein a resistivity of the antistatic layer is not less than a preset threshold.

3. The touch display panel according to claim 2, further comprising:
   a black matrix arranged between the opposite substrate and the antistatic layer; and
   auxiliary electrodes arranged at a side of the antistatic layer facing the touch electrode;
   wherein a resistivity of the auxiliary electrodes is less than that of the antistatic layer, and the auxiliary electrodes are located within a region of a projection of the black matrix onto the antistatic layer and are electrically connected to the antistatic layer.

4. The touch display panel according to claim 3, further comprising data lines and gate lines,
   wherein the auxiliary electrodes comprise:
   a plurality of first auxiliary electrodes extending in a gate line extending direction; and
   a plurality of second auxiliary electrodes extending in a data line extending direction,
   wherein the first auxiliary electrodes and the second auxiliary electrodes are spaced apart from each other.

5. The touch display panel according to claim 3, wherein the auxiliary electrodes comprise a third auxiliary electrode and a fourth auxiliary electrode, the third auxiliary electrode and the fourth auxiliary electrode are each of a grid structure, the third auxiliary electrode is spaced part from the fourth auxiliary electrode, and the third auxiliary electrode and the fourth auxiliary electrode are evenly distributed in a region where the antistatic layer overlaps the touch electrode.

6. The touch display panel according to claim 2, wherein an overall resistance value of the antistatic layer is not less than 108 ohms and not greater than 1010 ohms.

7. The touch display panel according to claim 2, wherein an overall resistance value of the antistatic layer is 108 ohms.

8. A touch display device, comprising:
   the touch display panel according to claim 1; and
   a driving module configured to apply the force scanning signal to the antistatic layer at a force scanning stage of the touch display device.

9. The touch display device according to claim 8, further comprising:
   a detection module configured to detect a change of a capacitance value of a mutual capacitance formed between the antistatic layer and the touch electrode at the force scanning stage; and
   a processing module configured to determine the value of a corresponding force based on the change detected by the detection module.

10. The touch display device according to claim 9, wherein
   the driving module is further configured to apply a common electrode signal to the touch electrode at a display stage of the touch display device, and apply a touch scanning signal to the touch electrode at a touch scanning stage of the touch display device.

11. The touch display device according to claim 8, wherein the force scanning signal is a common electrode signal.

12. A method for driving the touch display device according to claim 8, comprising:
applying the force scanning signal to the antistatic layer at a force detecting stage.

13. The method according to claim 12, further comprising:
applying a common electrode signal to the touch electrode at a display stage; and
applying a touch scanning signal to the touch electrode at a touch scanning stage.

14. The method according to claim 13, further comprising:
applying the common electrode signal to the antistatic layer at the display stage; and
maintaining the antistatic layer in a floating state during a touch detecting stage.

15. The method according to claim 12, further comprising:
applying a common electrode signal to the touch electrode and applying a touch scanning signal to the antistatic layer, at the force scanning stage.

16. The touch display device according to claim 8, wherein a resistivity of the antistatic layer is not less than a preset threshold.

17. The touch display device according to claim 16, wherein the touch display panel further comprises:
a black matrix arranged between the opposite substrate and the antistatic layer; and
auxiliary electrodes arranged at a side of the antistatic layer facing the touch electrode;
wherein a resistivity of the auxiliary electrodes is less than that of the antistatic layer, and the auxiliary electrodes are located within a region of a projection of the black matrix onto the antistatic layer and are electrically connected to the antistatic layer.

18. The touch display device according to claim 17, wherein the touch display panel further comprises data lines and gate lines,
wherein the auxiliary electrodes comprise:
a plurality of first auxiliary electrodes extending in a gate line extending direction; and
a plurality of second auxiliary electrodes extending in a data line extending direction,
wherein the first auxiliary electrodes and the second auxiliary electrodes are spaced apart from each other.

19. The touch display device according to claim 17, wherein
the auxiliary electrodes comprise a third auxiliary electrode and a fourth auxiliary electrode, the third auxiliary electrode and the fourth auxiliary electrode are each of a grid structure, the third auxiliary electrode is spaced part from the fourth auxiliary electrode, and the third auxiliary electrode and the fourth auxiliary electrode are evenly distributed in a region where the antistatic layer overlaps the touch electrode.

20. The touch display device according to claim 16, wherein an overall resistance value of the antistatic layer is not less than 108 ohms and not greater than 1010 ohms.

* * * * *